Sept. 19, 1967     J. D. HUBBARD     3,341,878

HAND FINISHING TOOL

Filed June 14, 1965     2 Sheets-Sheet 1

INVENTOR
Joel D. Hubbard
BY Robert M. Meith
ATTORNEY

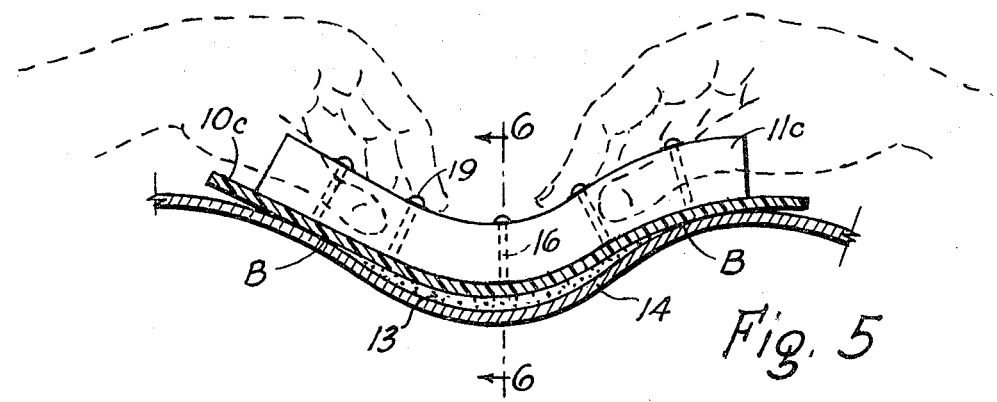
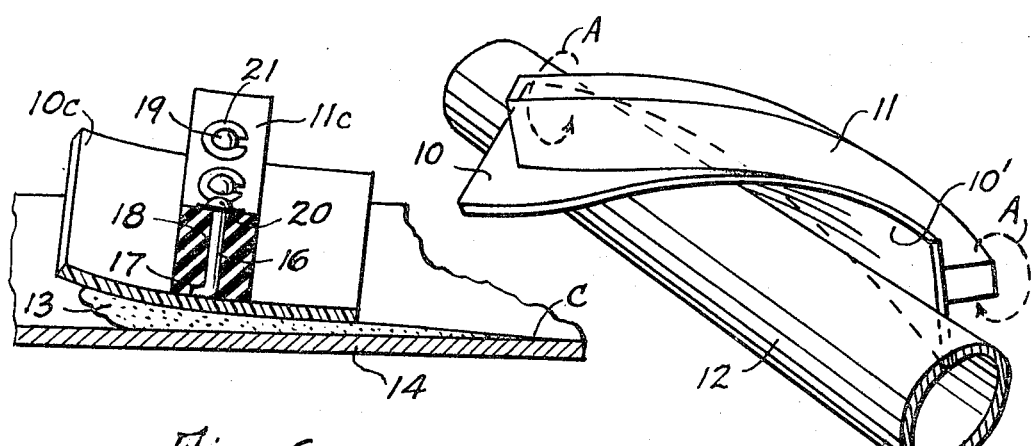
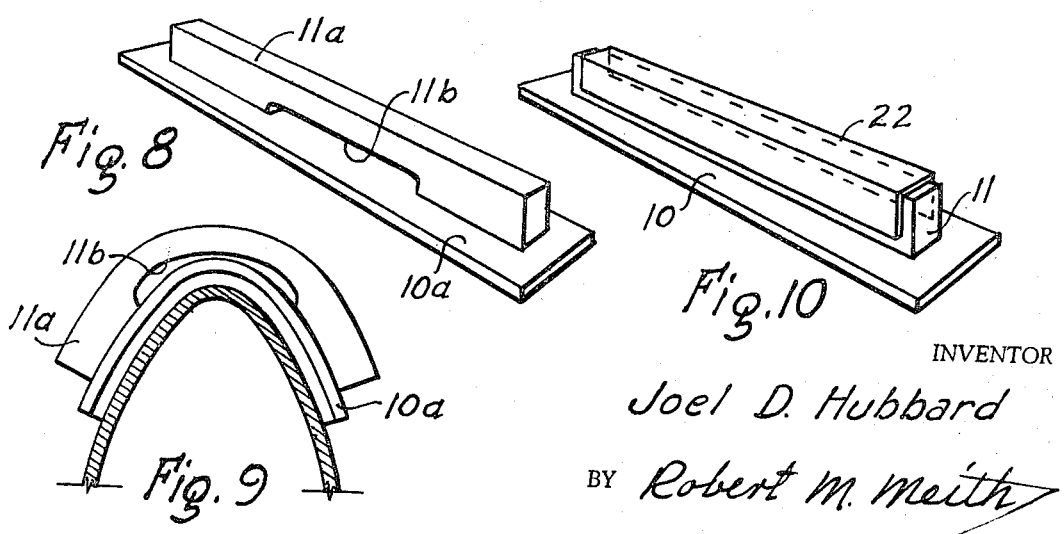
INVENTOR
Joel D. Hubbard
BY Robert M. Meith
ATTORNEY

United States Patent Office 3,341,878
Patented Sept. 19, 1967

3,341,878
HAND FINISHING TOOL
Joel D. Hubbard, Fairfax, Va., assignor of one-fourth to Robert M. Meith, Fairfax, Va.
Filed June 14, 1965, Ser. No. 463,761
17 Claims. (Cl. 15—235.4)

This invention relates to an improved hand finishing tool for applying viscous materials to either flat or curved surfaces.

More particularly, this invention relates to a new and useful tool which can be readily manipulated to uniformly apply viscous materials to objects having surfaces of varying contours and curvatures, including concave, convex and compound curved surfaces.

The present art of using plastic epoxy (putty) material in the repair or mending of auto bodies consists of applying the plastic epoxy while in a viscous state to the car body with a substantially rigid bladed tool such as a trowel or spatula having little or no flexibility.

With the use of such tools the plastic epoxy can only be applied to curved surfaces in a series of flat swaths of varying thickness with resultant ridges or trowel marks along the abutting or overlapping edges. When the epoxy has hardened these rough uneven surfaces require rasping and rough grinding to the general shape and form desired, followed by finish sanding to produce the fine smooth and even surface required in the trade preparatory to painting.

All of these steps are relatively laborous and time consuming and involve considerable waste of costly material.

Also the present art of insulating pipes, ducts, boilers, tanks, air conditioning units, etc., with viscous materials such as insulating cement, asbestos and fiberglass cements, consists of using a steel trowel or like semi-rigid tool having little or no flexibility to apply the insulating material and to form or shape the material to any irregular and curved surfaces being covered.

The use of such semi-rigid tools to apply the insulating cement results in thickness irregularities and surface ridges which are both unsightly and undesirable. This method is laborous, time consuming and inefficient.

One object of the invention is to provide an improved hand finishing tool which can be readily manipulated for applying viscous materials to flat or curved objects to produce a smooth even surface.

Another object of the invention is to provide a two handed flexible tool which can be readily manipulated by two hands during use to shape viscous material into desired configurations and forms.

Another object of the invention is to provide a two handed tool which can be readily manipulated to conform to the varying curvatures of an auto body or the like whereby a plastic epoxy filler (or like mending agent) may be uniformly applied with feathered edges and a smooth finished surface.

A further object of the invention is to provide a tool for applying plastic epoxy which tool is made of material having little or no cohesion for the plastic epoxy whereby the plastic epoxy will separate freely from the tool producing a smooth (nonporous) surface.

FIG. 2 is a side view of the invention in use for applying viscous material to the exterior of a circular duct, pipe or the like.

FIG. 5 is a partial sectional view showing the tool flexed in a compound curvature for applying viscous material to both the concave and convex surfaces of an object.

FIG. 6 is an enlarged sectional view taken on line 6—6 of FIG. 5.

FIG. 7 is a perspective view, showing the invention flexed longitudinally, transversely and torsionally to conform to the curvature of a relatively small diameter pipe.

FIG. 8 is a modification of the invention wherein the end portions of a modified form of finger grip are attached to the end portions of the blade.

FIG. 9 is a side view of the modified form shown in FIG. 8 flexed to conform to a body having a peaked curvature in cross section.

FIG. 10 is a perspective view of another modified form of the invention embodying a rigid channel bar snugly fitted over the flexible finger grip to provide longitudinal rigidity.

Figure 1:
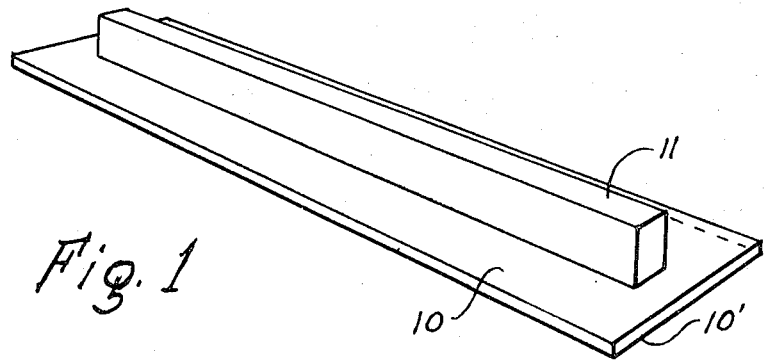
FIG. 1 is a perspective view of the invention.

This invention, FIG. 1, comprises an elongated flexible blade 10 having a normally flat face 10' and a flexible rib 11 which serves as a handle or finger grip extending longitudinally off the back of the blade. The blade 10 may be made of various well known flexible materials such as metal, rubber, plastic, etc., each of which has characteristics best suited for use with certain types of viscous materials as will be hereinafter set forth.

It is preferable that the blade and the rib be made of flexible materials which are resilient, as the tendency of these parts to spring back to their normal shape facilitates the manipulation of the tool and thus enhances its utility.

The longitudinal rib or finger grip 11 may be made integral with the blade when composed of the same substance such as when formed by molding process or securely attached to the blade by any of various suitable means. This longitudinal rib forms a firm but flexible support or brace for the blade 10.

I have found a finger grip made of relatively fine textured firm sponge rubber of uniform density or the like such as closed cell sponge neophrene medium firm to provide a suitable medium for transmitting varying pressures or forces to the blade through concerted action of the user's hands.

The flexibility of the blade and the finger grip enable the blade to be flexed longitudinally (FIGS. 2, 3, 4, 5, 6), transversely (FIGS. 3, 6, 7), or torsionally (FIG. 7), either individually or in combination. The arcuate arrows A at opposite ends of the finger grip, FIG. 7, indicate opposite directions of rotational force for effecting torsional flexing of the blade around a small diameter pipe 12. Such flexibility provides a greater range in degrees of curvatures and shapes than would otherwise be possible, absent either of these flexible movements.

In the preferred form of the invention the longitudinal rib or finger grip terminates about ½" short of each end of the blade and is securely attached throughout its length to the back of the blade. However, a modified form of the invention shown in FIGS. 8 and 9 wherein the finger grip 11a is recessed in its center area 11b and joined to the back of the blade 10a at its end portions, will, due to the absence of the rib support in the center portion of the blade, permit a more acute curvature of the blade face at this center area. A similar result can be obtained by using a finger grip 11 formed from material having areas of different densities and related flexibility positioned in relation to the blade so as to predetermine variables in the degree of curvature of the blade when same is flexed.

Likewise different densities of composition and relative flexibility of the material forming the blade may be utilized to predetermine variable in the degree of curvature of the blade when flexed.

Figure 2:
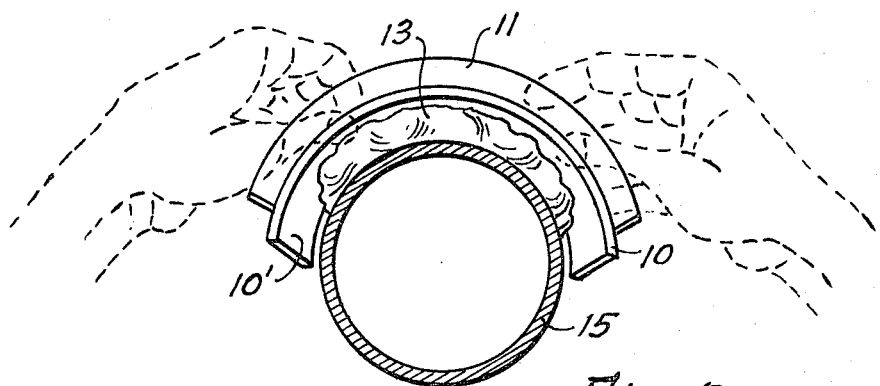
Figures 3, 4:
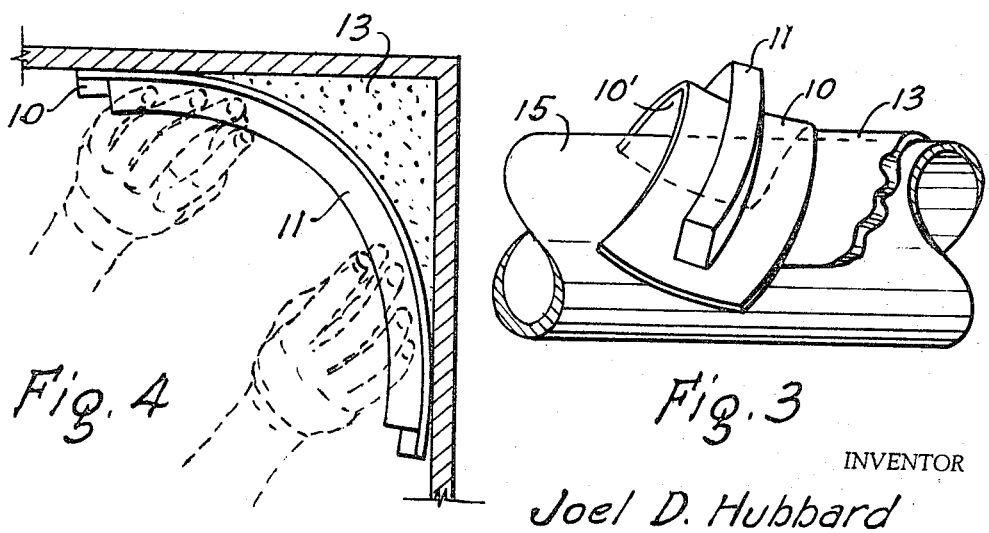
FIG. 3 shows a perspective end view of the invention taken at right angles to FIG. 2.
FIG. 4 shows the invention flexed in an arcuate convex position for use in forming an ornamental plaster cove along the corner of a room.

By holding the finger grip with the fingers of both hands as shown in FIGS. 2, 4 and 5, the viscous material 13 to be applied may be picked up on the blade face 10' from a mixing board and applied directly to the surface to be covered. This procedure is similar to that when using a standard trowel except this invention being flexible is held by both hands whereby the blade face may be readily flexed or shaped during application to conform to the curvatures of the surface being covered, as shown in FIGS. 2, 3 and 5 or to shape the material being applied, as shown in FIG. 4.

By such manipulation of the blade and the application of varying pressures exerted on the blade, the thickness of the layer of viscous material being applied may be controlled and varied to a fine degree such that a relatively smooth and even layer will result. By manipulating the shape of the blade and applying added pressure at the edges of the material being applied said edges may be tapered or feathered to form a continuous and smooth surface with the uncoated surface of the object 14 being partially covered, as indicated at points B and C in FIGS. 5 and 6.

As heretofore stated, the blade may be made of various flexible materials such as steel, rubber, plastic and the like, depending on the application or job. Blades made of each of these materials will have various degrees of flexibility and resilience depending on the temper, composition, size, shape and thickness and uniformity of the material.

Also, the size, shape, composition, uniformity and firmness of the materials forming the finger grip will affect the degree of flexibility and resilience of the blade.

The choice of blade materials and the degree of flexibility of the blade may be varied to accord with the use of the tool and the viscosity of the material to be applied.

A flexible resilient metal blade is best for use in applying and shaping plaster, cement or other viscous materials containing abrasive aggregates, such as sand, due to its better wearing qualities. For this work I have found a blade made of thin gauge low carbon cold rolled sheet steel of uniform thickness to be very satisfactory both as to ease of manipulation and wearing qualities. Likewise, I have found a convenient size tool for this work to consist of a rectangular blade of 3½ to 4" in width by 12" to 18" in length to which is bonded by contact glue a firm sponge rubber grip of 1" thickness by 1½" high by 11" to 17" in length.

A blade made of neoprene rubber is best suited for smoothly flowing viscous insulating materials such as fiberglass or asbestos (mud) cement or either flat or curved surfaces. For this work I have found a convenient size of the invention to be a rectangular blade 3" x 18" x ⅛" thickness with a finger grip of firm sponge rubber 1" high x ¾" thick x 17" long. A suitable bond of the finger grip to the neoprene blade may be had with contact glue. In applying viscous insulating material 13 such as fiberglass to pipes or cylindrical objects the fiberglass material may be picked up with the blade face 10' and applied by curving the blade face around the pipe 15 and exerting pressure on the blade to spread the material according to the layer thickness desired as the blade is moved longitudinally of the pipe. As shown in FIGS. 2 and 3, during the application or smoothing stroke the leading edge of the blade is slightly raised with the pressure being principally applied on the trailing half of the blade. With materials of relatively low viscosity, pressure is exerted more directly through the firmer area of the blade opposite the finger grip for spreading the material in desired thicknesses. With materials of relatively high viscosity pressure may be applied principally through the trailing edge of the blade to control the thickness and contour of the applied coat.

A blade made of thermoplastic such as polyethylene or polypropylene is best used for applying and shaping viscous materials of plastic composition such as plastic epoxy filler used in auto body repair work and the like. The face of the thermoplastic blade has a smooth hard and nonporous surface with very little adhesion for plastic materials, such that the plastic epoxy filler during application will separate and flow freely from the blade in a continuous smooth surface. Any dry or hardened plastic material left on the blade after use is easily removed.

For this work I have found very suitable a blade 10c, FIGS. 5 and 6, made of material commonly known as sheet polyethylene of uniform thickness ranging from 1/16" to ⅛" gauge or thickness and having an elongated or rectangular shape aproximately 4" wide and 12" long, with the finger grip 11c made of medium firm sponge rubber and ¾" thick by 1" high by 11" long.

As shown in FIGS. 5 and 6 the finger grip 11c is secured to the back of the blade by means of polyethylene dowels 16 which are thermally welded at one end 17 and at spaced intervals perpendicular to the back of the polyethylene blade 10c and along the longitudinal centerline thereof. In this adaption of the tool the finger grip 11c has vertical holes 18 at spaced intervals to correspond to the positions of the dowels. The dowels correspond in height to the finger grip 11c and have enlarged half-round heads 19 the flanges 20 of which overlap the top of the finger grip to secure it from displacement. Split washers 21 may be inserted under the flanges 20 to further secure the finger grip.

In assembling this form of the tool the finger grip is positioned with the holes 18 in alignment with the dowels, which have been thermal welded to the blade. The finger grip is then pressed onto the dowels until the flanged heads 19 protrude above and overlap the top of the finger grip. The holes 18 are of smaller diameter than the dowels so that the resilient rubber will be slightly compressed when positioned on the dowels and thereby provide a snug fit.

In auto body work epoxy filler or coating is applied only to the limited areas of the car body being mended. As such epoxy filler is relatively expensive, the ability to use it efficiently is obviously very important in the trade.

As previously set forth the user of this invention is enabled to readily apply viscous material such as epoxy filler in a layer of desired thickness and at the same time form feathered edges (FIG. 5) continuous with the car body thus producing a smooth surface which at most needs only finish sanding. Being able to apply the epoxy filler in a layer of desired thickness and also produce a smooth surface which needs little or no finish standing, eliminates the heretofore tedious application of excessive amounts of filler and the time consuming operations of rasping or rough sanding to thickness and shape desired, resulting in substantial savings in both material and labor costs of from ⅓ to ½ that heretofore experienced with the use of conventional tools. With experience the efficiency and utility of the invention will increase in relation to the user's dexterity and skill in manipulation.

A modified form of the invention, shown in FIG. 10, consists of a rigid channel bar 22 fitted snugly over the flexible finger grip 11. The channel bar may be of metal or other substance which when fitted on the finger grip will serve to stiffen it and hold it substantially rigid throughout its entire length. To permit easy manipulation of the tool with either one or two hands when applying viscous materials to flat surfaces the snug fit of the bar 22 over the finger grip 11 is such that the bar may be readily and easily removed from or pressed onto the finger grip as desired.

In this modification of the invention the blade 10 may still be flexed transversely of its width to conform to curved bends in rectangular air ducts or the like so that insulating cement or other coating material may be applied with a smooth and continuous surface.

This means of readily changing from a flexible to a substantially inflexible tool greatly increases the utility of the invention in work involving either flat or curved surfaces or a combination of both.

I claim:
1. A hand finishing tool comprising a flexible blade member having a normally flat face portion and a back portion, and a flexible handle member secured to the back portion of the blade member, said flexible handle member being capable of being held by both hands of a user and providing means whereby the user's hands may act in continuous concert to manually flex said face portion along all axes of said face portion.

2. A hand finishing tool as set forth in claim 1, wherein said flexible blade member is elongated and the flexible handle extends from the back portion of said blade member and disposed substantially perpendicularly to said face portion and substantially coextensive with the length of said blade member.

3. A hand finishing tool as set forth in claim 1, wherein the face portion of the blade member is composed of thermoplastic to provide a working surface having substantially no adhesion for viscous materials whereby said viscous materials will freely separate from said face portion with a relatively smooth surface on being worked in desired forms through manipulation of the tool.

4. A hand finishing tool as set forth in claim 1, together with means readily adaptable to the flexible handle member to render the same substantially inflexible and form a rigid support for the blade member.

5. The apparatus of claim 4 in which said means is a rigid channel bar adapted to have a snug fit over the flexible handle member whereby said channel bar may be readily adapted to or removed from the handle member.

6. A hand finishing tool as set forth in claim 4, wherein the handle member is formed of material having areas of different densities to provide varying degrees of flexibility in said handle member and related variables in the degree of curvature of the blade when flexed.

7. In a hand finishing tool, a flexible blade having a normally flat face side and a back side, said blade being of substantially uniform thickness, and a flexible rib attached to the back of the blade, said rib providing a finger grip through which the force of the user's hands acting in continuous concert is applied to flex the blade simultaneously along its transverse and longitudinal axes to form compound curvatures.

8. A hand finishing tool as set forth in claim 7, with said flexible rib being formed of sponge rubber.

9. A hand finishing tool as set forth in claim 7, with the blade being formed of flexible sheet neoprene.

10. A hand finishing tool as set forth in claim 7, with the blade being formed of sheet polyethylene, and means for attaching the rib to the back of the blade.

11. A hand finishing tool as set forth in claim 10, with said rib attaching means comprising dowels integral with said blade and extending perpendicularly thereto at spaced intervals, said rib having holes therein at spaced intervals to receive the dowels, and means for securing the rib on the dowels.

12. In a hand finishing tool, an elongated flexible blade having a normally flat face side and a back side, a flexible rib attached to the back of the blade along the longitudinal centerline thereof, said rib providing a finger grip through which the force of the user's hands acting in continuous concert is applied to flex the blade along all axes thereof.

13. A hand finishing tool as set forth in claim 12, with the blade being formed of resilient sheet material of uniform thickness.

14. A hand finishing tool as set forth in claim 12, with said blade being formed of resilient material having a normal predetermined shape, and said rib being substantially coextensive with the blade.

15. A hand finishing tool as set forth in claim 12, with the means readily adaptable to the flexible rib to hold it substantially inflexible and form a rigid support for the blade.

16. In a hand finishing tool, a flexible blade having a face side and a back side, a flexible rib formed of resilient material attached to the back of the blade and normally supporting the blade face in a predetermined position, said rib providing a finger grip whereby the user's hands may act together in unison to flex the blade face simultaneously along its transverse and longitudinal axes.

17. A hand finishing tool as set forth in claim 16, with said blade being elongated and of uniform thickness, said rib being disposed longitudinally of the blade and substantially coextensive therewith so that unequal pressures may be exerted at spaced intervals on the blade face.

References Cited
UNITED STATES PATENTS

| | | | |
|---|---|---|---|
| 952,971 | 3/1910 | Wolary et al. | 15—235.8 |
| 1,768,411 | 6/1930 | Lord | 15—235.4 |
| 2,048,529 | 7/1936 | Williams | 15—235.5 |
| 2,551,105 | 5/1951 | Eiden et al. | 15—235.4 |
| 3,123,947 | 3/1964 | Rawley | 15—235.8 X |

FOREIGN PATENTS 630,051  11/1927  France.

CHARLES A. WILLMUTH, *Primary Examiner.*

R. L. BLEUTGE, *Assistant Examiner.*